US009487018B2

(12) United States Patent
Hasegawa et al.

(10) Patent No.: US 9,487,018 B2
(45) Date of Patent: Nov. 8, 2016

(54) INK-JET PRINTER AND METHOD OF PERFORMING PRINTING

(71) Applicant: Brother Kogyo Kabushiki Kaisha, Nagoya-shi, Aichi-ken (JP)

(72) Inventors: Shin Hasegawa, Nagoya (JP); Tomohiro Nodsu, Seto (JP); Shotaro Kanzaki, Nagoya (JP); Masaru Someya, Nagoya (JP); Masanobu Ogawa, Kasugai (JP); Hiroto Sugahara, Ama (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/087,360

(22) Filed: Mar. 31, 2016

(65) Prior Publication Data
US 2016/0288527 A1 Oct. 6, 2016

(30) Foreign Application Priority Data
Mar. 31, 2015 (JP) .................................. 2015-074353

(51) Int. Cl.
*B41J 2/21* (2006.01)
*B41J 2/045* (2006.01)

(52) U.S. Cl.
CPC ............. *B41J 2/2103* (2013.01); *B41J 2/2139* (2013.01)

(58) Field of Classification Search
CPC B41J 2/04506; B41J 2/0456; B41J 2/04586; B41J 2/2103; B41J 2/2128; B41J 2/2139
See application file for complete search history.

(56) References Cited

U.S. PATENT DOCUMENTS

| 6,830,306 B2* | 12/2004 | Couwenhoven ..... B41J 2/04506 347/12 |
| 7,360,855 B2* | 4/2008 | Miyamoto ............. B41J 2/2128 347/15 |

FOREIGN PATENT DOCUMENTS

| JP | H09-76483 A | 3/1997 |
| JP | 2000-135782 A | 5/2000 |
| JP | 2011-000761 A | 1/2011 |

* cited by examiner

*Primary Examiner* — Thinh H Nguyen
(74) *Attorney, Agent, or Firm* — Banner & Witcoff, Ltd.

(57) ABSTRACT

An ink-jet printer, including a density detector and a controller, wherein, where successive three ejecting operations to be repeatedly performed on the same predetermined region of a recording medium are defined as first through third ejecting operations in the order of performance, the controller executes: a process for detecting a color density of the predetermined region immediately after attachment of the ink ejected in the second ejecting operation; a process for calculating, based on the detected color density, an estimated density after fixation of the ink ejected in the second ejecting operation; a process for calculating, based on print data, an ideal density after fixation of the ink ejected in the second ejecting operation; and a process for correcting the print data based on a difference between the estimated density and the ideal density, and wherein the ink-jet printer performs the third ejecting operation based on the corrected print data.

12 Claims, 14 Drawing Sheets

FIG.6A
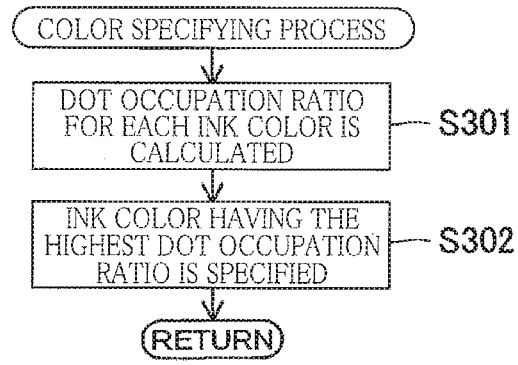
FIG.6B
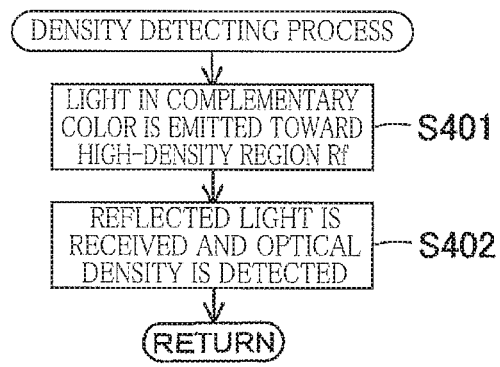
FIG.7A
| K 1 (PLAIN PAPER) | | ENVIRONMENTAL TEMPERATURE | |
| --- | --- | --- | --- |
| | | LESS THAN 20°C | NOT LOWER THAN 20°C |
| ENVIRONMENTAL HUMIDITY | LESS THAN 60% | 1.2 | 1.1 |
| | NOT LOWER THAN 60% | 1.3 | 1.2 |
FIG.7B
| K 1 (GLOSSY PAPER) | | ENVIRONMENTAL TEMPERATURE | |
| --- | --- | --- | --- |
| | | LESS THAN 20°C | NOT LOWER THAN 20°C |
| ENVIRONMENTAL HUMIDITY | LESS THAN 60% | 1.25 | 1.15 |
| | NOT LOWER THAN 60% | 1.35 | 1.25 |

| DUTY RATIO (%) | 0-50 | 50-60 | 60-70 | 70-80 | 80-90 | 90-100 | 100-150 | 150-200 |
|---|---|---|---|---|---|---|---|---|
| K2 | 1.0 | 1.02 | 1.03 | 1.05 | 1.07 | 1.10 | 1.11 | 1.12 |

FIG.11A

| K 1 | | ENVIRONMENTAL TEMPERATURE | |
|---|---|---|---|
| | | LESS THAN 20°C | NOT LOWER THAN 20°C |
| ENVIRONMENTAL HUMIDITY | LESS THAN 60% | 1.02 | 1.01 |
| | NOT LOWER THAN 60% | 1.03 | 1.02 |

FIG.11B

| K 1 | ENVIRONMENTAL TEMPERATURE | |
|---|---|---|
| | LESS THAN 20°C | NOT LOWER THAN 20°C |
| PLAIN PAPER | 1.25 | 1.15 |
| GLOSSY PAPER | 1.3 | 1.2 |

FIG.11C

| K 1 | | PLAIN PAPER | GLOSSY PAPER |
|---|---|---|---|
| ENVIRONMENTAL HUMIDITY | LESS THAN 60% | 1.15 | 1.2 |
| | NOT LOWER THAN 60% | 1.25 | 1.2 |

FIG.12A

| | | K 1 |
|---|---|---|
| ENVIRONMENTAL TEMPERATURE | LESS THAN 20°C | 1.025 |
| | NOT LOWER THAN 20°C | 1.015 |

FIG.12B

| | | K 1 |
|---|---|---|
| ENVIRONMENTAL HUMIDITY | LESS THAN 60% | 1.015 |
| | NOT LOWER THAN 60% | 1.025 |

FIG.12C

| | K1 |
|---|---|
| PLAIN PAPER | 1.20 |
| GLOSSY PAPER | 1.25 |

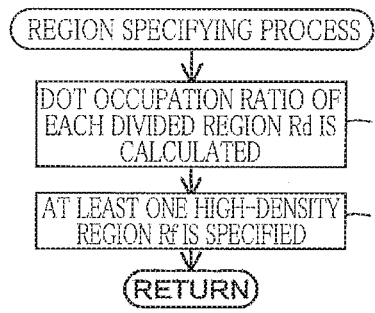
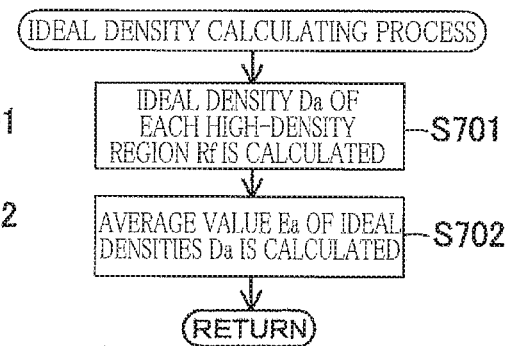
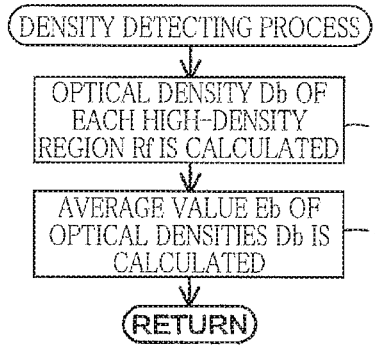
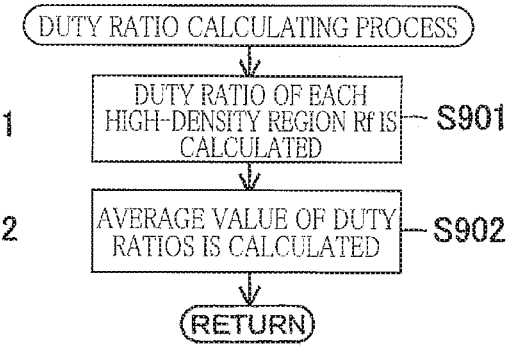
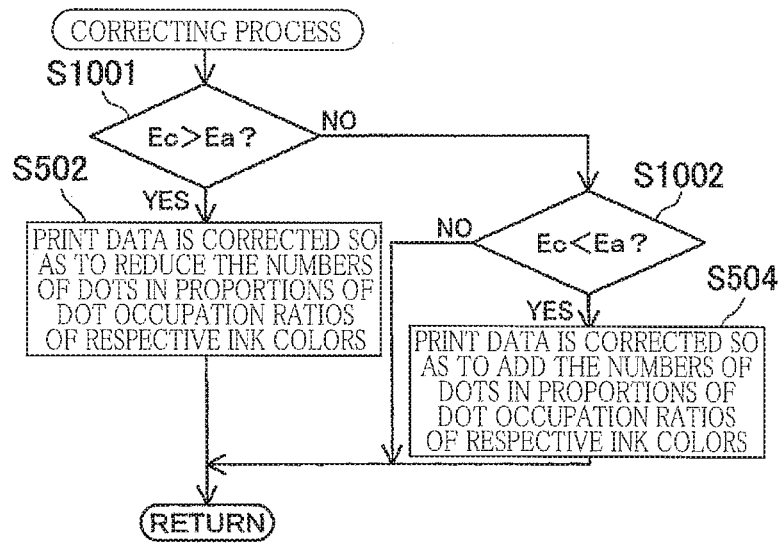

SCANNING
DIRECTION
LEFT ⇔ RIGHT

↓ CONVEYANCE
   DIRECTION

INK-JET PRINTER AND METHOD OF PERFORMING PRINTING

CROSS REFERENCE TO RELATED APPLICATION

The present application claims priority from Japanese Patent Application No. 2015-074353, which was filed on Mar. 31, 2015, the disclosure of which is herein incorporated by reference in its entirety.

BACKGROUND

1. Technical Field

The following disclosure relates to an ink-jet printer configured to perform printing by ejecting ink from nozzles and relates to a method of printing.

2. Description of Related Art

There is known a recording apparatus in which an ink-jet head mounted on a carriage ejects ink toward a recording medium during a scanning movement of the carriage in a main scanning direction, so as to perform printing. In the known apparatus, the scanning movement is repeated plurality of times while the recording medium is conveyed, so that printing is repeatedly performed on the same region of the recording medium. That is, the so-called multi-path printing is performed. When such multi-path printing is performed, a printed image may suffer from density unevenness due to a variation in an amount by which the recording medium is conveyed. To obviate such density unevenness of the printed image, the known apparatus performs printing in the following manner. Data for one scanning movement is read from a print buffer, and a sensor provided on the carriage detects a printed state. Subsequently, a deviation of a density detected by the sensor with respect to an expected density is calculated, and a way to correct the print data for obviating the density unevenness in subsequent scanning is determined based on the deviation.

SUMMARY

In the known apparatus, because the sensor reads the printed state during printing, the sensor detects a color density which is a density of a color on a surface of the recording medium immediately after ink has been attached, namely, a density of an image formed on the recording medium immediately after ink has been attached. However, it takes a certain time before the attached ink is fixed on the recording medium. Further, the color density of the recording medium changes before the ink is fixed after having been attached to the recording medium. Consequently, in an instance where the way to correct the print data for obviating the density unevenness in subsequent scanning is determined based on the calculated deviation of the density immediately after attachment of the ink with respect to the expected density, there may be a risk that the determined way is improper.

An aspect of the disclosure relates to an ink-jet printer and a method of printing in which, when printing is repeatedly performed on the same region of a recording medium by repeating an ejecting operation for ejecting ink from a plurality of nozzles of an ink-jet head while moving the ink-jet head in a scanning direction, printing is performed by properly correcting print data.

In one aspect of the disclosure, an ink-jet printer includes: an ink-jet head configured to eject ink from a plurality of nozzles while moving in a scanning direction; a conveyor configured to convey a recording medium in a conveyance direction orthogonal to the scanning direction; a density detector configured to move with the ink-jet head in the scanning direction for detecting a color density which is a density of a color on a surface of the recording medium; and a controller configured to control the ink-jet head, the conveyor, and the density detector, wherein the controller controls the ink-jet printer such that the ink-jet printer repeatedly and alternately performs an ejecting operation in which the ink-jet head ejects the ink from the nozzles based on print data while moving in the scanning direction and a conveying operation in which the conveyor conveys the recording medium, so that printing is repeatedly performed on the same predetermined region of the recording medium in a plurality of ejecting operations performed at least three times, wherein, where successive three ejecting operations among the plurality of ejecting operations are defined as a first ejecting operation, a second ejecting operation, and a third ejecting operation in the order of performance, the controller executes: a density detecting process for controlling the density detector to detect the color density of the predetermined region immediately after the ink ejected in the second ejecting operation has been attached to the predetermined region; an estimated density calculating process for calculating, based on the color density detected in the density detecting process, an estimated density which is an estimated value of the color density of the predetermined region after fixation of the ink ejected in the second ejecting operation; an ideal density calculating process for calculating, based on the print data, an ideal density which is an ideal value of the color density of the predetermined region after fixation of the ink ejected in the second ejecting operation; and a correcting process for correcting the print data based on a difference between the estimated density and the ideal density, and wherein the controller controls the ink-jet printer to perform the third ejecting operation based on the print data corrected in the correcting process.

In another aspect of the disclosure, a method of performing printing by an ink-jet printer comprises: an ejecting step of ejecting ink from a plurality of nozzles of an ink-jet head based on print data while moving the ink-jet head in a scanning direction; and a conveying step of conveying, by a conveyor, a recording medium in a conveyance direction orthogonal to the scanning direction, wherein the ejecting step and the conveying step are repeatedly and alternately executed, so that printing is repeatedly performed on the same predetermined region of the recording medium by a plurality of ejecting steps executed at least three times, wherein, where successive three ejecting steps among the plurality of ejecting steps are defined as a first ejecting step, a second ejecting step, and a third ejecting step in the order of execution, the method further comprising: a density detecting step of detecting the color density of the predetermined region immediately after the ink ejected in the second ejecting step has been attached to the predetermined region, by a density detector configured to move with the ink-jet head in the scanning direction for detecting the color density on the surface of the recording medium; an estimated density calculating step of calculating, based on the color density detected in the density detecting step, an estimated density which is an estimated value of the color density of the predetermined region after fixation of the ink ejected in the second ejecting step; an ideal density calculating step of calculating, based on the print data, an ideal density which is an ideal value of the color density of the predetermined region after fixation of the ink ejected in the second ejecting step; and a correcting step of correcting the print data based on a difference between the estimated density and the ideal density, wherein the ink is ejected from the nozzles based on the corrected print data in the third ejecting step.

BRIEF DESCRIPTION OF THE DRAWINGS

The objects, features, advantages, and technical and industrial significance of the present disclosure will be better understood by reading the following detailed description of one embodiment, when considered in connection with the accompanying drawings, in which:

FIG. 6A is a flow chart showing a color specifying process and FIG. 6B is a flow chart showing a density detecting process;

FIG. 7A is a view showing one example of a table indicating a relationship between: an environmental temperature and an environmental humidity; and a first coefficient K1 in an instance where a recording sheet P is plain paper and FIG. 7B is a view showing one example of a table indicating a relationship between: the environmental temperature and the environmental humidity; and the first coefficient in an instance where the recording sheet is glossy paper;

FIG. 11A is a view showing one example of a table indicating a relationship between: the environmental temperature and the environmental humidity; and the first coefficient K1 according to a second modification, FIG. 11B is a view showing one example of a table indicating a relationship between: the environmental temperature and a type of the recording sheet; and the first coefficient K1 according to a third modification, and FIG. 11C is a view showing one example of a table indicating a relationship between: the environmental humidity and the type of the recording sheet; and the first coefficient K1 according to a fourth modification;

FIG. 12A is a view showing one example of a table indicating a relationship between: the environmental temperature; and the first coefficient K1 according to a fifth modification, FIG. 12B is a view showing one example of a table indicating a relationship between: the environmental humidity; and the first coefficient K1 according to a sixth modification, and FIG. 12C is a view showing one example of a table indicating a relationship between: the type of the recording sheet; and the first coefficient K1 according to a seventh modification;

FIGS. 13A-13E are flow charts respectively showing a region specifying process, an ideal density calculating process, a density detecting process, a duty ratio calculating process, and a correcting process, according to an eighth modification;

DETAILED DESCRIPTION OF EMBODIMENT

Figure 1:
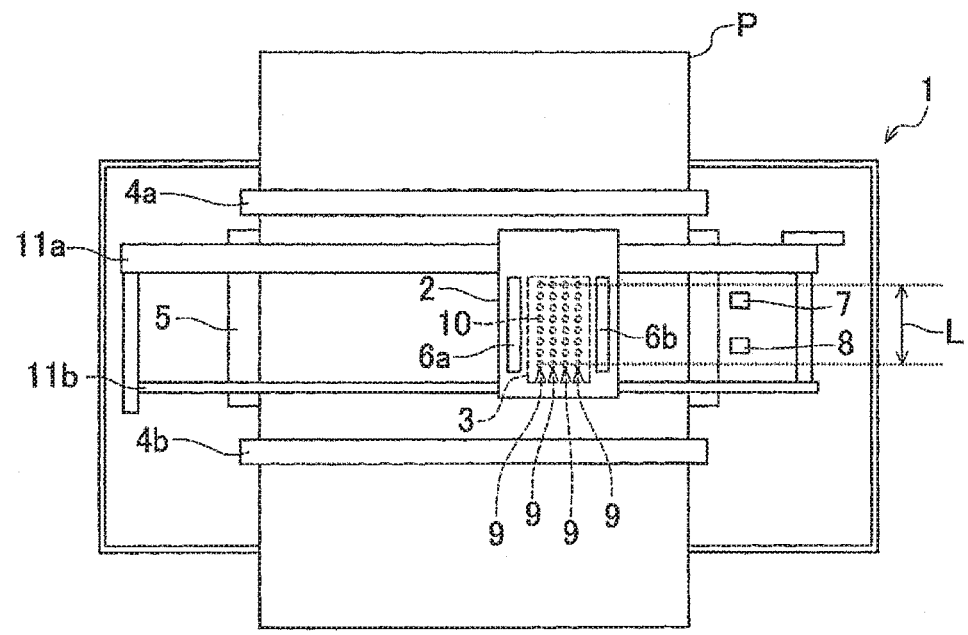
FIG. 1 is a view schematically showing a structure of an ink-jet printer according to one embodiment.

There will be hereinafter described one embodiment.
Overall Structure of Ink-Jet Printer As shown in FIG. 1, an ink-jet printer 1 according to one embodiment includes a carriage 2, an ink-jet head 3, conveying rollers 4a, 4b, a platen 5, density sensors 6a, 6b, a temperature sensor 7, and a humidity sensor 8. The carriage 2 is movable in a scanning direction along two guide rails 11a, 11b extending in the scanning direction. The carriage 2 is connected to a carriage motor 61 (FIG. 2) through a belt, pulleys, and so on (not shown). When the carriage motor 61 is driven, the carriage reciprocates in the scanning direction. In the following description, a right side and a left side are defined with respect to the scanning direction, as shown in FIG. 1.

The ink-jet head 3 is mounted on the carriage 2. When the carriage 2 moves in the scanning direction, the ink-jet head 3 also moves in the scanning direction. A plurality of nozzles 10 are formed in a lower surface of the ink-jet head 3. The nozzles 10 are arranged, over a distance L, in a conveyance direction orthogonal to the scanning direction, so as to form a nozzle row 9. In the ink-jet head 3, four nozzle rows 9 are formed so as to be arranged in the scanning direction. The four nozzles rows 9 respectively eject black ink, yellow ink, cyan ink, and magenta ink in the order from the right.

Figure 2:
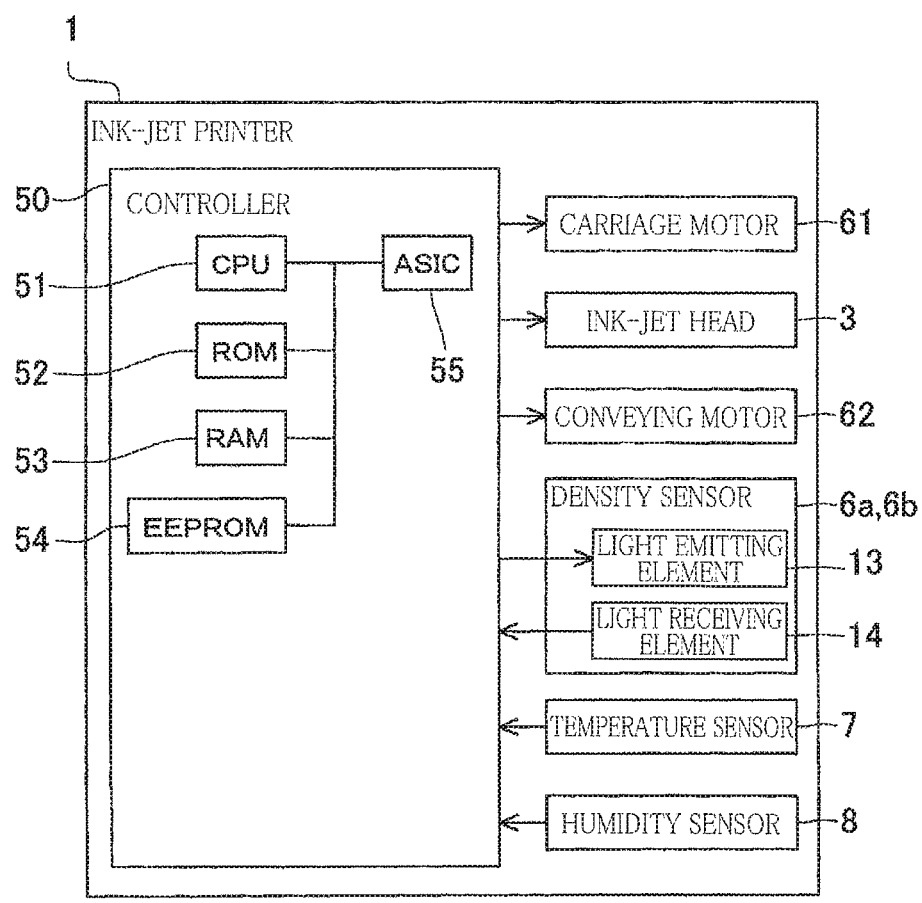
FIG. 2 is a block diagram showing a hardware structure of the ink-jet printer.

The conveying roller 4a is disposed upstream of the carriage 2 in the conveyance direction while the conveying roller 4b is disposed downstream of the carriage 2 in the conveyance direction. The conveying rollers 4a, 4b are connected to a conveying motor 62 (FIG. 2). When the conveying motor 62 is driven, the conveying rollers 4a, 4b convey a recording sheet P (as one example of a recording medium) in the conveyance direction. The platen 5 is disposed between the conveying rollers 4a, 4b in the conveyance direction so as to be opposed to the lower surface of the ink-jet head 3. The platen 5 is configured to support the recording sheet P conveyed by the conveying rollers 4a, 4b from below.

The density sensors 6a, 6b are mounted on the carriage 2. When the carriage 2 moves in the scanning direction, the density sensors 6a, 6b move with the ink-jet head 3 in the scanning direction. The density sensor 6a is disposed to the left of the ink-jet head 3 while the density sensor 6b is disposed to the right of the ink-jet head 3. Each of the density sensors 6a, 6b has a light emitting element 13 and a light receiving element 14 (FIG. 2). The light emitting element 13 emits light toward the recording sheet P supported on the platen 5. The light emitting element 13 is configured to emit one light selected from among light in three colors which are complementary colors for the respective three ink colors (i.e., cyan, magenta, and yellow) and light for reading black. Specifically, the light whose color is a complementary color for cyan is red light, the light whose color is a complementary color for magenta is green light, and the light whose color is a complementary color for yellow is blue light. The light for reading black is white light. The light receiving element 14 is configured to receive light emitted from the light emitting element 13 and reflected on the recording sheet P and to thereby detect an optical density (OD value) on the surface of the recording sheet P.

The temperature sensor 7 is disposed in the vicinity of the platen 5 for detecting an environmental temperature around the recording sheet P supported on the platen 5. The humidity sensor 8 is disposed in the vicinity of the platen 5 for detecting an environmental humidity around the recording sheet P supported on the platen 5.

Controller

There will be next explained a controller 50 for controlling operations of the ink-jet printer 1. As shown in FIG. 2, the controller 50 includes a central processing unit (CPU) 51, read only memory (ROM) 52, random access memory (RAM) 53, electrical erasable programmable read only memory (EEPROM) 54, and an application specific integrated circuit (ASIC) 55, which cooperate with one another to control operations of the carriage motor 61, the ink-jet head 3, the conveying motor 62, and the density sensors 6a, 6b. The controller 50 receives signals from the density sensors 6a, 6b, the temperature sensor 7, and the humidity sensor 8.

In FIG. 2, only one CPU 51 is illustrated. The controller 50 may have only one CPU 51, and the one CPU 51 may execute processing in a centralized manner. Alternatively, the controller 50 may have a plurality of CPUs 51, and the plurality of CPUs 51 may cooperate to execute processing. In FIG. 2, only one ASIC 55 is illustrated. The controller 50 may have only one ASIC 55, and the one ASIC 55 may execute processing in a centralized manner. Alternatively, the controller 50 may have a plurality of ASICs 55, and the plurality of ASICs 55 may cooperate to execute processing.

Control in Printing by Ink-Jet Printer

There will be next explained a method of performing printing by the ink-jet printer 1. The controller 50 controls the ink-jet printer 1 such that the ink-jet printer 1 repeatedly and alternately performs: an ejecting operation in which the carriage 2 is moved in the scanning direction and the ink-jet head 3 that moves with the carriage 2 in the scanning direction ejects ink from the nozzles 10; and a conveying operation in which the recording sheet P is conveyed by the conveying rollers 4a, 4b by a predetermined distance. Thus, printing is performed on the recording sheet P. In this instance, the ink is ejected from the nozzles 10 both of when the carriage 2 is moved toward the right side (FIG. 1) in the scanning direction and when the carriage is moved toward the left side (FIG. 1) in the scanning direction. That is, ink-jet printer 1 performs the so-called bidirectional printing. In the conveying operation, the recording sheet P is conveyed by a distance L/3 which is one-third of a length L of each nozzle row 9. Consequently, printing is repeatedly performed on the same region of the recording sheet P by successive three ejecting operations. That is, the ink-jet printer 1 performs the so-called multi-path printing.

Figure 3:
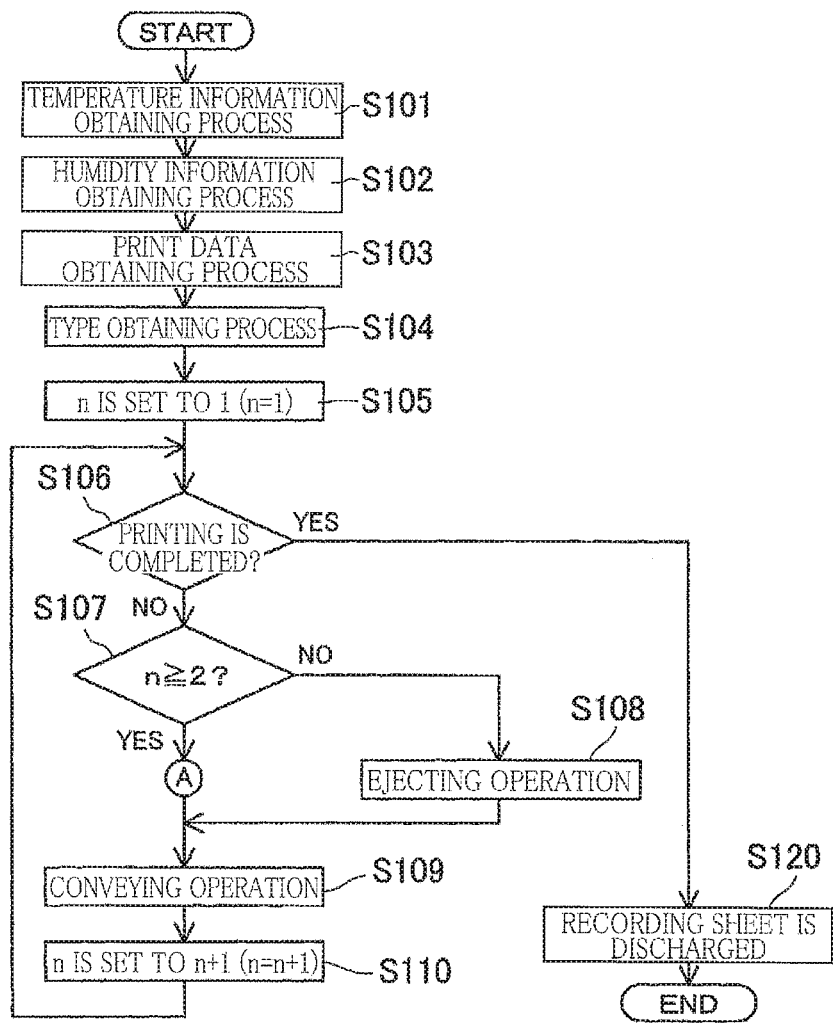
FIG. 3 is a flow chart showing processing when printing is performed in the ink-jet printer.

The controller 50 controls the ink-jet printer 1 according to a flow chart of FIG. 3, so that ink-jet printer 1 performs the multi-path printing. When the ink-jet printer 1 performs printing, the controller 50 initially executes a temperature information obtaining process (S101) for obtaining temperature information from the temperature sensor 7 and a humidity information obtaining process (S102) for obtaining humidity information from the humidity sensor 8. The controller 50 subsequently executes a print data obtaining process (S103) for obtaining print data transmitted from a personal computer (PC) or the like, not shown, and a type obtaining process (S104) for obtaining information on a type of the recording sheet P transmitted from the PC or the like.

Figure 4:
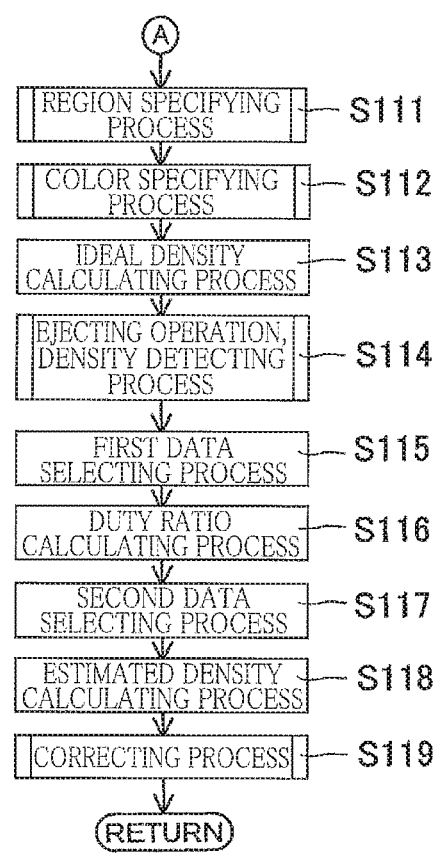
FIG. 4 is a flow chart showing processing indicated by "A" in FIG. 3.

Thereafter, the controller 50 stores a variable n in the RAM 53 (S105). An initial value of the variable n is equal to 1. The variable n represents an ordinal number of the ejecting operation to be next performed. The processes of S101-S105 may be executed in order different from the order shown in FIG. 3. Until printing is completed, namely, during a time period in which negative decision is made at S106 (S106: NO), S107-S119 shown in FIGS. 3 and 4 are executed.

At S107, the controller 50 determines whether the variable n is equal to or greater than 2. When the variable n is equal to 1 (S107: NO), the ejecting operation is executed (S108) and the conveying operation is executed (S109). Thereafter, the controller 50 increments the variable n by 1 (S110), and the control flow returns to S106.

Figure 5A:
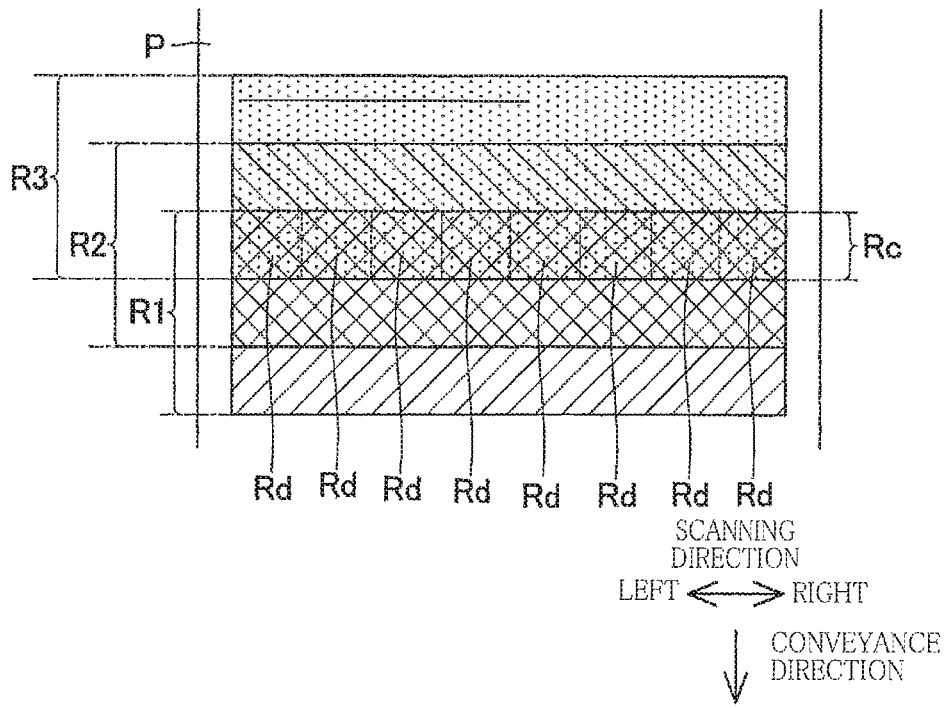
FIG. 5A is a view for explaining a region of a recording medium on which printing is performed by successive three ejecting operations and FIG. 5B is a flow chart showing a region specifying process.

On the other hand, when the variable n is equal to 2 or greater (S107: YES), the controller 50 initially executes a region specifying process (S111), as shown in FIG. 4. The region specifying process is a process for specifying a region of the recording sheet P for which the optical density is to be detected by the density sensors 6a, 6b. As shown in FIG. 5A, the controller 50 specifies, in the region specifying process, one of a plurality of divided regions Rd as a region for which the optical density is to be detected by the density sensors 6a, 6b. Here, the plurality of divided regions Rd are obtained by dividing, in the scanning direction, an overlapping region Rc of the recording sheet P in which the following three regions R1-R3 of the recording sheet P partially overlap one another, i.e., a region R1 on which printing has been performed in a previous ejecting operation, a region R2 on which printing is to be performed in a subsequent ejecting operation at S114, and a region R3 on which printing is to be performed in a further subsequent ejecting operation.

Figure 5B:
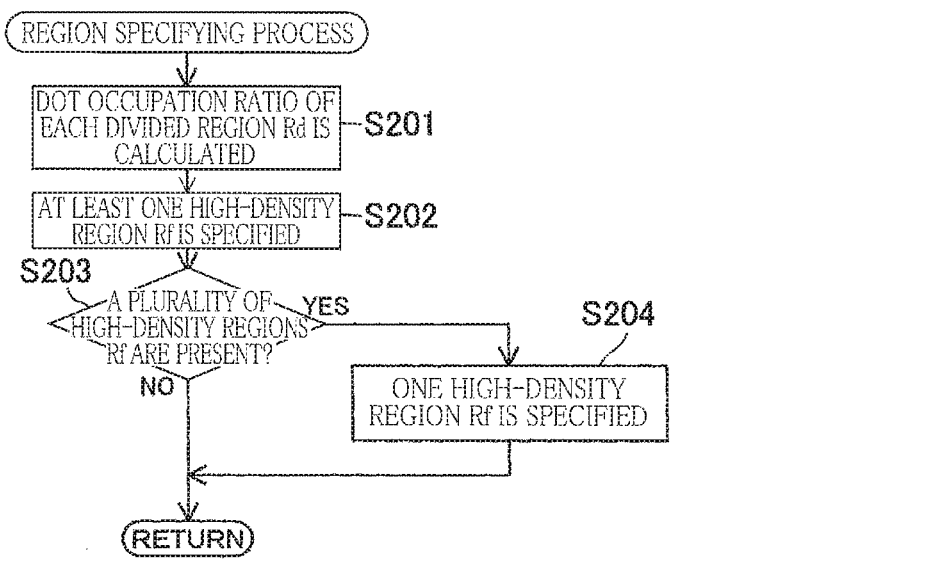

As shown in FIG. 5B, in the region specifying process, the controller 50 calculates, based on print data, a dot occupation ratio of each of the divided regions Rd (S201). The dot occupation ratio indicates the number of ink dots to be attached per unit area in each divided region Rd. The controller 50 subsequently specifies, as a high-density region Rf, at least one of the plurality of divided regions Rd that has the dot occupation ratio of not smaller than a predetermined threshold (S202). The threshold is a value equal to about 50-60% of a maximum number of the ink dots per unit area. In an instance where only one divided region Rd is specified as the high-density region Rf at S202 (S203: NO), the process ends because one high-density region Rf is already specified in this stage. On the other hand, in an instance where a plurality of divided region Rd each specified as the high-density region Rf at S202 are present (S203: YES), the controller 50 specifies, based on the print data, one high-density region Rf among the plurality of high-density regions Rf (S204), and the process ends. At S204, the controller 50 specifies, based on the print data, one high-density region Rf among the plurality of high-density regions Rf which has the smallest number of successively adjacent blank dots to each of which ink is not attached.

After the region specifying process of S111, the controller 50 executes a color specifying process (S112) for specifying a color of the ink (ink color) for which the density is to be detected by the density sensors 6a, 6b. As shown in FIG. 6A, in the color specifying process, the controller 50 calculates, based on the print data, the dot occupation ratio for each ink color in the above-indicated one high-density region Rf (dot occupation ratio obtaining process) (S301). The controller 50 specifies one ink color having the highest dot occupation ratio (S302). Thus, the controller 50 specifies the one ink color as the ink color for which the density is to be detected by the density sensors 6a, 6b.

The controller 50 subsequently executes an ideal density calculating process (S113) in which, based on the print data, the controller 50 calculates, for the ink color specified at S112, an ideal density Da which is an ideal value of the optical density of the above-indicated one high-density region Rf after fixation of the ink attached to the overlapping region Rc in printing on the region R2 by an ejecting operation to be next performed. In this respect, the EEPROM 54 stores a relationship between a duty ratio for each ink color and an optical density. Here, the duty ratio is defined as follows. In an instance where a certain region is printed in one color, the duty ratio means a ratio of an actual amount of ink to be ejected to this certain region with respect to a maximum amount of ink that can be ejected to this certain region. In the ideal density calculating process, the ideal density Da for the ink color specified at S112 is calculated based on print data for performing printing on the regions R1, R2.

The controller 50 subsequently controls the ink-jet printer 1 to perform the ejecting operation for performing printing on the region R2 and executes a density detecting process (S114) in which the controller 50 controls the density sensors 6a, 6b to detect, during the movement of the carriage 2 in this ejecting operation, an optical density Db of the above-indicated one high-density region Rf. As shown in FIG. 6B, in the density detecting process, the controller 50 controls the light emitting element 13 to emit, toward the above-indicated one high-density region Rf specified at S111, light whose color is a complementary color for the color specified at S302 (S401), and the controller 50 controls the light receiving element 14 to receive light reflected on the region Rf for thereby detecting the optical density Db (S402).

In this instance, the controller 50 controls the density sensor 6a to detect the optical density Db when the carriage 2 is moved rightward while the controller 50 controls the density sensor 6b to detect the optical density Db when the carriage 2 is moved leftward. Thus, the optical density Db of the above-indicated one high-density region Rf immediately after attachment of the ink in printing on the region R2 by the ejecting operation is detected for the ink color specified at S112.

The controller 50 subsequently executes a first data selecting process (S115) for selecting a first coefficient K1. In this respect, the EEPROM 54 of the controller 50 stores, for each type of the recording sheet P, a table indicating a relationship between: a range of the environmental temperature and a range of the environmental humidity; and the first coefficient K1, as shown in FIGS. 7A and 7B, for instance. In other words, a plurality of first coefficients K1 are stored in the EEPROM 54 in connection with the environmental temperature, the environmental humidity, and the type of the recording sheet P. The first coefficient K1 becomes smaller with an increase in the environmental temperature and becomes larger with an increase in the environmental humidity. The table of FIG. 7A indicates the relationship in a case where the recording sheet P is plain paper, and the table of FIG. 7B indicates the relationship in a case where the recording sheet P is glossy paper.

In the first data selecting process, the controller 50 selects one first coefficient K1 from among the plurality of first coefficients K1 in the table based on the temperature information obtained at S101, the humidity information obtained at S102, and the type of the recording sheet P obtained at S104.

The controller 50 subsequently executes a duty ratio calculating process (as one example of an attached amount information obtaining process) (S116) for calculating, based on the print data, a duty ratio (as one example of attached amount information) in the above-indicated one high-density region Rf.

Figures 8, 9:
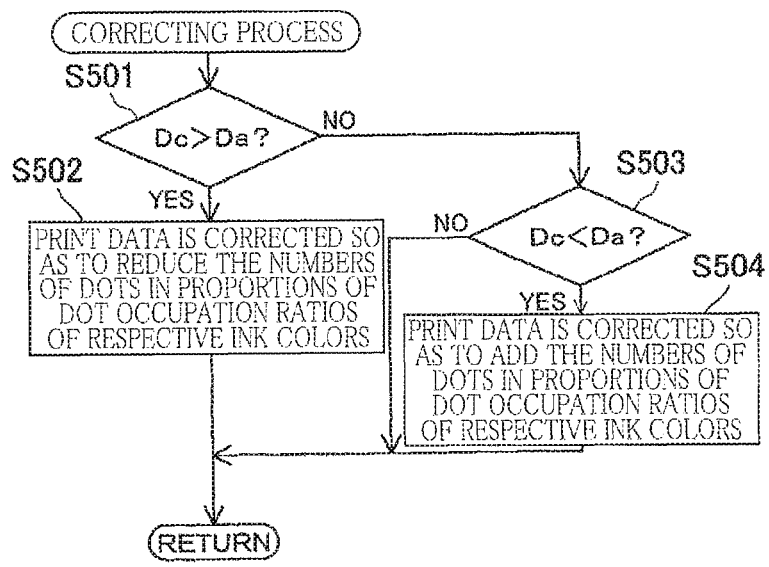
FIG. 8 is a view showing one example of a table indicating a relationship between a duty ratio and a second coefficient K2.
FIG. 9 is a flow chart showing a correcting process.

The controller 50 subsequently executes a second data selecting process (S117) for selecting a second coefficient K2 based on the duty ratio calculated at S116. In this respect, the EEPROM 54 of the controller 50 stores a table indicating a relationship between a range of the duty ratio and the second coefficient K2, as shown in FIG. 8. In other words, a plurality of second coefficients K2 are stored in the EEPROM 54 in connection with the duty ratio. In monochrome printing in which printing is performed by using only black ink, the duty ratio is equal to or lower than 100%. In color printing, ink of a plurality of different colors may be overlappingly attached to the same position of the recording sheet. Consequently, the duty ratio sometimes exceeds 100% in color printing.

In the second data selecting process, the controller 50 selects one second coefficient K2 from among the plurality of second coefficients K2 in the table based on the duty ratio calculated at S117. The controller 50 subsequently executes an estimated density calculating process (S118) for calculating an estimated density Dc based on the optical density Db detected at S114, the first coefficient K1 selected at S115, and the second coefficient K2 selected at S117. In the estimated density calculating process, the controller 50 multiplies the optical density Db detected in the density detecting process at S114 by the first coefficient K1 selected at S115 and the second coefficient K2 selected at S117, so as to obtain a value (=Db×K1×K2) as the estimated density Dc.

The controller 50 subsequently executes a correcting process (S119) for correcting the print data based on a difference between the ideal density Da calculated at S113 and the estimated density Dc calculated at S118. As shown in FIG. 9, in the correcting process, the controller 50 corrects the print data for the respective ink colors (S502) so as to reduce the numbers of dots to be attached for the respective ink colors in proportions of the dot occupation ratios of the respective ink colors calculated at S301 when the estimated density Dc is greater than the ideal density Da (S501: YES). In an instance where the proportions of the respective dot occupation ratios of black, yellow, cyan, and magenta are 2:4:2:6, the black dots, the yellow dots, the cyan dots, and the magenta dots are reduced in proportions of 2:4:2:6.

On the other hand, when the estimated density Dc is smaller than the ideal density Da (S501: NO, S503: YES), the controller 50 corrects the print data for respective ink colors (S504) so as to add the numbers of dots to be attached for the respective ink colors in proportions of the dot occupation ratios of the respective ink colors calculated at S301. In an instance where the proportions of the respective dot occupation ratios of black, yellow, cyan, and magenta are 2:4:2:6, the black dots, the yellow dots, the cyan dots, and the magenta dots are added in proportions of 2:4:2:6.

When the estimated density Dc is equal to the ideal density Da, the controller 50 does not correct the print data.

Thereafter, the control flow returns to S109 (FIG. 3) at which the controller 50 controls the ink-jet printer 1 to perform the conveying operation. The control 50 increments the variable n by 1 (S110), and the control flow returns to S106. When printing is completed (S106: YES), the controller 50 controls the conveying rollers 4a, 4b to discharge the recording sheet P (S120), and the processing ends.

When printing is performed according to the control described above, the optical density Db of the overlapping region Rc immediately after attachment of the ink ejected in the ejecting operation for printing on the region R2 is detected in printing on the region R2. The print data is corrected based on a difference between the estimated density Dc calculated from the optical density Db and the ideal density Da, and the ejecting operation for performing printing on the region R3 is performed based on the corrected print data.

In an instance where the so-called multi-path printing is performed, a printed image may suffer from density unevenness due to a variation in an amount of conveyance of the recording sheet P by the conveying rollers 4a, 4b in the conveying operation. In the present embodiment, in contrast, when printing is performed on the regions R1-R3 of the recording sheet P including the overlapping region Rc by successive three ejecting operations, the ideal density Da is calculated based on the print data, the ideal density Da being an ideal value of the optical density of the overlapping region Rc after fixation of the ink attached to the recording sheet P by the ejecting operation for printing on the region R2. Further, the optical density Db of the overlapping region Rc immediately after attachment of the ink ejected in the ejecting operation for printing on the region R2 is detected, and the estimated density Dc which is an estimated value of the optical density after fixation of the ink is calculated based on the detected optical density Db. Subsequently, the print data is corrected based on a difference between the ideal density Da and the estimated density Dc, and the ejecting operation for performing printing on the region R3 is performed based on the corrected print data. Thus, the density unevenness due to a variation in the amount of conveyance of the recording sheet P in the conveying operation is obviated by correction of the print data.

It takes some time before the ink that has been attached to the recording sheet P is fixed to the recording sheet P. In a time period before the attached ink is fixed to the recording sheet P, the density on the surface of the recording sheet P to which the ink has been attached varies. Consequently, even if the print data is corrected based on a difference between the optical density Db detected by the density sensors 6a, 6b and the ideal density Da, the print data cannot be properly corrected in the conventional arrangement. In the present embodiment, in contrast, the estimated density Dc is calculated from the optical density Db, and the print data is corrected based on a difference between the estimated density Dc and the ideal density Da, so that the print data can be properly corrected.

The water component in the ink is unlikely to evaporate at a lower environmental temperature around the recording sheet P and at a higher environmental humidity around the recording sheet P. Consequently, it takes a longer time before the ink that has been attached to the recording sheet P is fixed to the recording sheet P. Further, the time period before the attached ink is fixed to the recording sheet P changes depending on the type (material or the like) of the recording sheet P. Moreover, a change in the density of the overlapping region Rc in the time period before the attached ink is fixed to the recording sheet P becomes larger with an increase in the duty ratio.

In view of the above, the estimated density Dc is calculated in the present embodiment by multiplying the optical density Db detected by the density sensors 6a, 6b by the temperature detected by the temperature sensor 7, the humidity detected by the humidity sensor 8, the first coefficient K1 selected in accordance with the type of the recording sheet P, and the second coefficient K2 selected in accordance with the duty ratio. Thus, the estimated density Dc is accurately calculated.

The density unevenness due to a variation in the amount of conveyance of the recording sheet P in the conveying operation is prominent in a region in which the dot occupation ratio is higher and the number of successively adjacent blank dots is smaller. In the present embodiment, therefore, the controller 50 specifies, as the high-density region Rf, at least one divided region Rd having the dot occupation ratio of not smaller than the threshold among the plurality of divided regions Rd which are obtained by dividing the overlapping region Rc in the scanning direction. Further, in an instance where a plurality of high-density regions Rf are present, one of the plurality of high-density regions R that has the smallest number of successively adjacent blank dots is specified as the high-density region. The print data is corrected based on a difference between the ideal density Da and the estimated density Dc for the specified one high-density region Rf. Thus, the printed image is effectively prevented from suffering from the density unevenness.

The density unevenness due to a variation in the amount of conveyance of the recording sheet P in the conveying operation is prominent in the ink color having a higher dot occupation ratio. In the present embodiment, therefore, the print data is corrected based on a difference between the ideal density Da and the estimated density Dc for the ink color having the highest dot occupation ratio. Thus, the printed image is effectively prevented from suffering from the density unevenness. Further, in the present embodiment, the light emitting element 13 emits, in the density detecting process, light whose color is a complementary color for the ink color having the highest dot occupation ratio, so that the optical density Db for the ink color having the highest dot occupation ratio is detected.

When the print data is corrected based on a difference between the ideal density Da and the estimated density Dc for the specified one high-density region Rf, the print data for the respective ink colors are corrected in proportions of the dot occupation ratios of the respective ink colors. Thus, the print data for the respective ink colors are properly corrected.

In the present embodiment, the conveying rollers 4a, 4b and the conveying motor 62 are one example of a conveyor. The density sensors 6a, 6b are one example of a density detector. The EEPROM 54 is one example of a storage, and a combination of the data of the first coefficient K1 and the data of the second coefficient K2 is one example of estimation data. Among the three successive ejecting operations for performing printing on the overlapping region Rc, the ejecting operation for performing printing on the region R1 is one example of a first ejecting operation, the ejecting operation for performing printing on the region R2 is one example of a second ejecting operation, and the ejecting operation for performing printing on the region R3 is one example of a third ejecting operation. Each of the environmental temperature, the environmental humidity, and the type of the recording sheet P is one example of a fixing time condition. The duty ratio is one example of ejection amount information.

There will be next explained modifications.

In the illustrated embodiment, the EEPROM 54 stores the table indicating the relationship between the duty ratio and the second coefficient K2. The EEPROM 54 may store a table indicating other relationship. For instance, the EEPROM 54 may store a table indicating a relationship between: ejection amount information indicative of an ink ejection amount per unit area; and the second coefficient K2.

Figure 10:
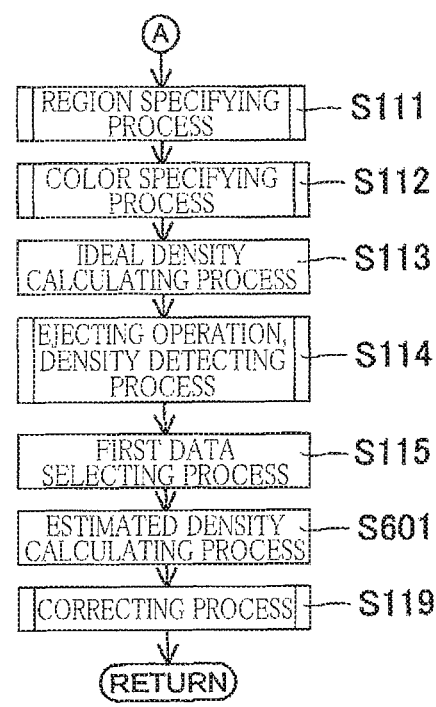
FIG. 10 is a flow chart showing processing according to a first modification, the processing corresponding to that of FIG. 4.

In the illustrated embodiment, the EEPROM 54 stores the first coefficients K1 and the second coefficients K2. By multiplying the optical density Db detected by the density sensors 6a, 6b by the first coefficient K1 and the second coefficient K2, the estimated density Dc is calculated. The estimated density Dc may be calculated otherwise. In a first modification, the EEPROM 54 stores the first coefficients K1, but does not store the second coefficients K2. As shown in FIG. 10, the controller 50 does not execute the duty ratio calculating process (S116) and the second data selecting process (S117) shown in FIG. 4 after the first data selecting process (S115). The controller 50 calculates the estimated density Dc in an estimated density calculating process (S601) by multiplying the optical density Db detected at S114 by the first coefficient K1 selected at S115.

In the illustrated embodiment, the EEPROM 54 stores the first coefficients K1 in connection with the three fixing time conditions, i.e., the environmental temperature, the environmental humidity, and the recording sheet P. The EEPROM 54 may store a table indicating other relationship. In a second modification shown in FIG. 11A, the EEPROM 54 stores a table indicating a relationship between: the environmental temperature and the environmental humidity; and the first coefficient K1, irrespective of the type of the recording sheet P. In a third modification shown in FIG. 11B, the EEPROM 54 stores a table indicating a relationship between: the environmental temperature and the type of the recording sheet P; and the first coefficient K1, irrespective of the environmental humidity. In a fourth modification shown in FIG. 11C, the EEPROM 54 stores a table indicating a relationship between: the environmental humidity and the type of the recording sheet P; and the first coefficient K1, irrespective of the environmental temperature.

In a fifth modification shown in FIG. 12A, the EEPROM 54 stores a table indicating a relationship between the environmental temperature and the first coefficient K1, irrespective of the environmental humidity and the type of the recording sheet P. In a sixth modification shown in FIG. 12B, the EEPROM 54 stores a relationship between the environmental humidity and the first coefficient K1, irrespective of the environmental temperature and the type of the recording sheet P. In a seventh modification shown in FIG. 12C, the EEPROM 54 stores a table indicating a relationship between the type of the recording sheet P and the first coefficient K1, irrespective of the environmental temperature and the environmental humidity.

In the fourth, sixth, and seventh modifications, the temperature sensor 7 (FIG. 1) may be eliminated. In the third, fifth, and seventh modifications, the humidity sensor 8 (FIG. 1) may be eliminated.

The EEPROM 54 may store a table indicating a relationship between the first coefficient K1 and a fixing time condition that influences on the time required for the ink attached to the recording sheet P to be fixed thereto, other than the environmental temperature, the environmental humidity, and the type of the recording sheet P. Alternatively, the EEPROM 54 may store one first coefficient K1, irrespective of the fixing time conditions. In this instance, the first coefficient K1 may be set to 1.15, for instance.

In the illustrated embodiment, in an instance where a plurality of high-density regions Rf are present, one high-density region Rf having the smallest number of the successively adjacent blank dots is specified in the region specifying process, and the print data is corrected based on a difference between the ideal density Da and the estimated density Dc for the specified one high-density region Rf. The one high-density region Rf may be specified otherwise. For instance, the controller 50 may specify the one high-density region Rf at S204 based on a condition other than the number of the successively adjacent blank dots.

It is not necessarily required to specify one high-density region Rf among the plurality of high-density regions Rf. In an eighth modification, as shown in FIG. 13A, the controller 50 specifies, in the region specifying process, the high-density region(s) (S201, S202) as in the illustrated embodiment, and the process ends irrespective of the number of high-density regions Rf specified at S202. As shown in FIG. 13B, the controller 50 calculates, in the ideal density calculating process, the ideal density Da for each high-density region Rf (S701) and calculates an average value Ea of the ideal densities Da (S702). As shown in FIG. 13C, the controller 50 detects, in the density detecting process, the optical density Db for each high-density region Rf (S801) and calculates an average value Eb of the optical densities Db (S802). As shown in FIG. 13D, the controller 50 calculates, in the duty ratio calculating process, the duty ratio for each high-density region Rf (S901) and calculates an average value of the duty ratios (S902). In the eighth modification, the controller 50 calculates, in the estimated density calculating process, an average value Ec of the estimated density by multiplying the average value Eb of the optical density by the first coefficient K1 and the second coefficient K2.

In the eighth embodiment, as shown in FIG. 13E, the controller 50 corrects the print data (S502) in the correcting process so as to reduce the numbers of dots to be attached for the respective ink colors when the average value Ec of the estimated density is greater than the average value Ea of the ideal density (S1001: YES). The controller 50 corrects the print data (S504) so as to add the numbers of dots to be attached for the respective ink colors when the average value Ec of the estimated density is smaller than the average value Ea of the ideal density (S1001: NO, S1002: YES).

Figure 14:
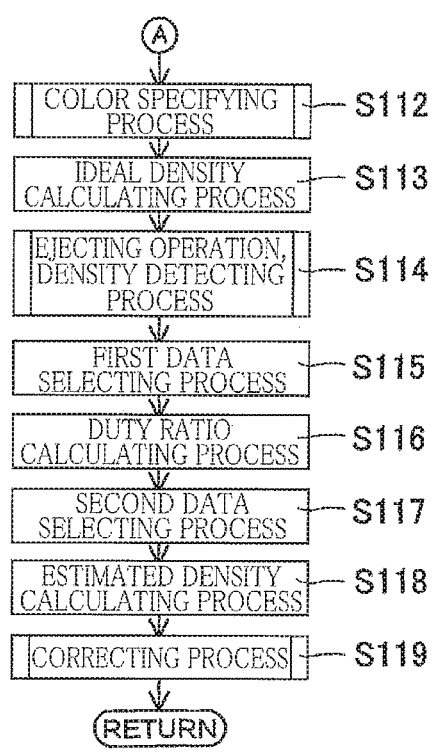
FIG. 14 is a flow chart showing processing according to a ninth modification, the processing corresponding to that of FIG. 4.
Figure 15A:
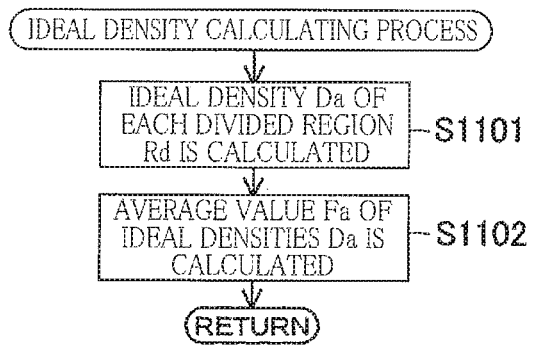
FIGS. 15A-15D are flow charts respectively showing an ideal density calculating process, a density detecting process, a duty ratio calculating process, and a correcting process, according to the ninth modification.
Figure 15B:
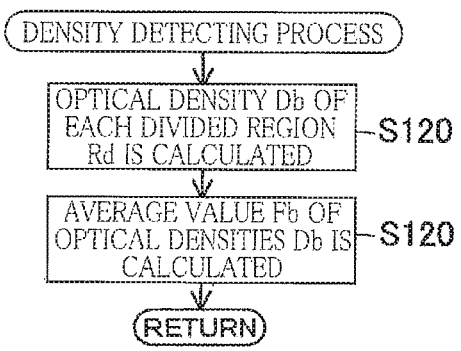
Figure 15C:
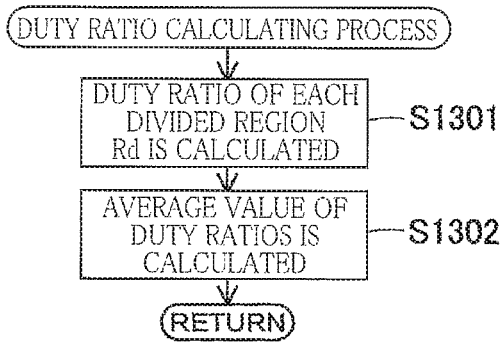

It is not necessarily required to correct the print data based on a difference between the ideal density and the estimated density of the high-density region Rf. As shown in FIG. 14, the controller 50 does not execute the region specifying process (S111) (FIG. 3) in a ninth modification. As shown in FIG. 15A, the controller 50 calculates, in the ideal density calculating process, the ideal density Da for each divided region Rd (S1101) and calculates an average value Fa of the ideal densities Da (S1102). As shown in FIG. 15B, the controller 50 detects the optical density Db for each divided region Rd (S1201) and calculates an average value Fb of the optical densities Db (S1202), in the density detecting process. As shown in FIG. 15C, the controller 50 calculates, in the duty ratio calculating process, the duty ratio for each divided region Rd (S1301) and calculates an average value of the duty ratios (S1302). In the ninth embodiment, the controller 50 calculates an average value Fc of the estimated density by multiplying the average value Fb of the optical density by the first coefficient K1 and the second coefficient K2.

Figure 15D:
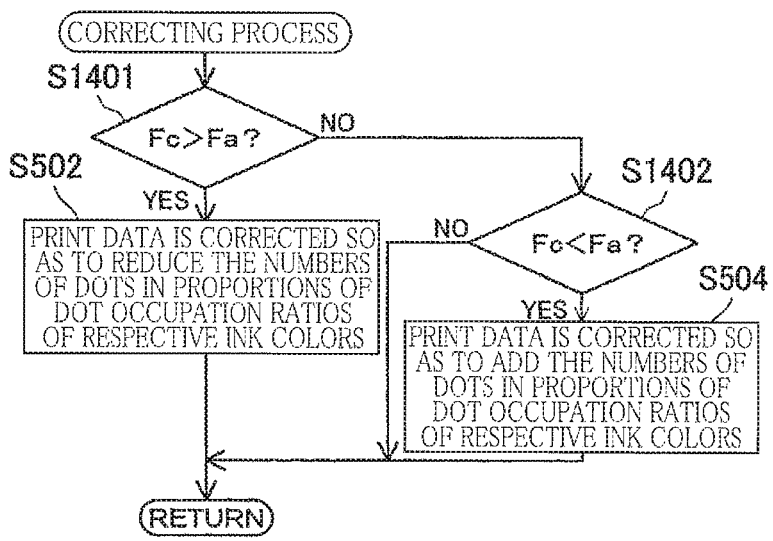

As shown in FIG. 15D, when the average value Fc of the estimated density is greater than the average value Fa of the ideal density (S1401: YES), the controller 50 corrects, in the correcting process, the print data so as to reduce the numbers of ink dots to be attached for the respective ink colors (S502), as in the illustrated embodiment. On the other hand, when the average value Fc of the estimated density is smaller than the average value Fa of the ideal density (S1401: NO, S1402: YES), the controller 50 corrects the print data so as to add the numbers of ink dots to be attached for the respective ink colors (S504), as in the illustrated embodiment.

In the illustrated embodiment, the print data is corrected in accordance with a difference between the ideal density Da and the estimated density Dc of the one of the ink colors having the highest dot occupation ratio. In this instance, the print data is corrected in proportions of the dot occupation ratios of the respective ink colors. The print data may be corrected otherwise.

Figure 16:
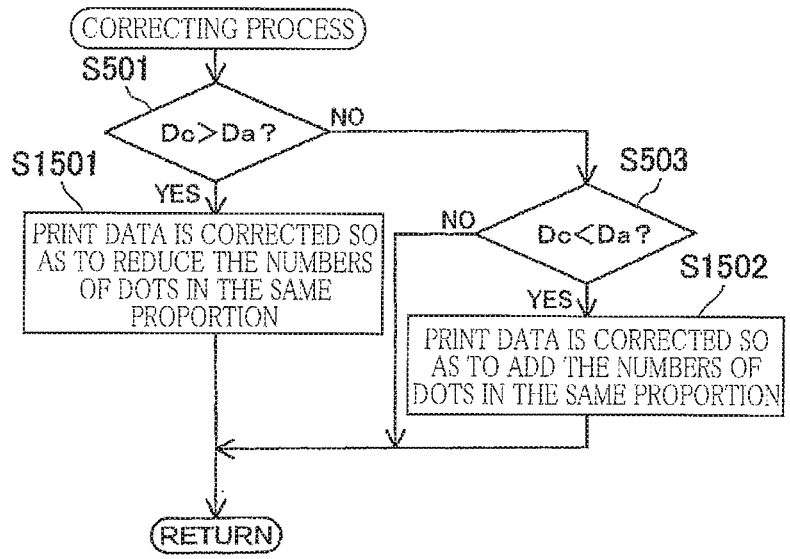
FIG. 16 is a flow chart showing a correcting process according to a tenth modification.

In a tenth modification shown in FIG. 16, when the estimated density Dc is greater than the ideal density Da (S501: YES), the controller 50 corrects, in the correcting process, the print data so as to reduce the numbers of ink dots for the respective ink colors in the same proportion (S1501). On the other hand, when the estimated density Dc is smaller than the ideal density Da (S501: NO, S503: YES), the controller 50 corrects the print data so as to add the numbers of ink dots for the respective ink colors in the same proportion (S1502).

Figure 17:
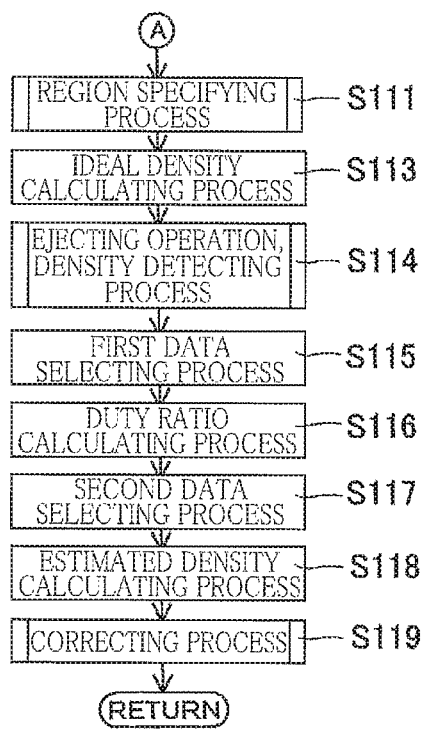
FIG. 17 is a flow chart showing processing according to an eleventh modification, the processing corresponding to that of FIG. 4.

In an eleventh modification shown in FIG. 17, the controller 50 does not execute the color specifying process (FIG. 3). The controller 50 executes individually for the respective ink colors the ideal density calculating process (S113), the density detecting process (S114), the estimated density calculating process (S118), and the correcting process (S119). In this instance, the controller 50 controls, in the density detecting process (S114), the light emitting element 13 such that light emitted therefrom is switched, at a high speed during the movement of the carriage 2, among the complementary colors for the respective ink colors, whereby the optical density Db for each ink color is detected.

In the illustrated embodiment, the light emitting element 13 of each density sensor 6a, 6b is configured to selectively emit light in respective colors which are the complementary colors for the respective ink colors. The density sensors 6a, 6b may be configured otherwise. For instance, each density sensor 6a, 6b may be configured such that the light emitting element 13 emits light in only one color such as white and the light receiving element 14 receives light reflected on the recording sheet P, so that the density sensors 6a, 6b detect the density on the recording sheet P as the optical density converted into gray scale. In this instance, the color specifying process (FIG. 3) is not executed, as in the eleventh modification. Further, the ideal density Da of the overlapping region Rc converted in gray scale is calculated in the ideal density calculating process, the optical density Db of the overlapping region Rc converted into gray scale is detected in the density detecting process, and the estimated density Dc of the overlapping region Rc converted into gray scale is calculated in the estimated density calculating process. In this instance, a media sensor for detecting presence or absence of the recording sheet P may be used as the density sensors 6a, 6b.

Each density sensor 6a, 6b may be a sensor other than the optical sensor configured to emit light toward the recording sheet P and to detect the optical density based on an amount of light reflected on the recording sheet P.

In the illustrated embodiment, the ink-jet head 3 ejects ink in different four colors. The ink-jet head 3 may eject ink in different two, three, five or more colors. Alternatively, the ink-jet head 3 may eject ink in only one color.

In an instance where the ink-jet head 3 is configured to perform monochrome printing by ejecting only black ink, a relationship between a duty ratio in monochrome printing and an optical density is stored in the EEPROM 54. In this instance, the ideal density Da is calculated in the ideal density calculating process of S113 based on print data for performing printing on the regions R1, R2.

In the illustrated embodiment, printing is repeatedly performed on the same region of the recording sheet P by the successive three ejecting operations. The invention may be applicable to an instance in which printing is repeatedly performed on the same region of the recording sheet P by successive four or more ejecting operations. In this instance, in order to repeatedly perform printing on the same region of the recording sheet P by N-times ejecting operations, the recording sheet P needs to be conveyed in the conveying operation by a distance "L/N".

In the illustrated embodiment, the ink-jet printer 1 is configured to perform the so-called bidirectional printing in which ink is ejected from the nozzles 10 both of when the carriage 2 moves leftward (FIG. 1) in the scanning direction and rightward (FIG. 1) in the scanning direction. To this end, the density sensors 6a, 6b are disposed on one and the other of opposite sides of the ink-jet head 3 in the scanning direction of the carriage 2. The density sensors 6a, 6b may be disposed otherwise.

Figure 18:
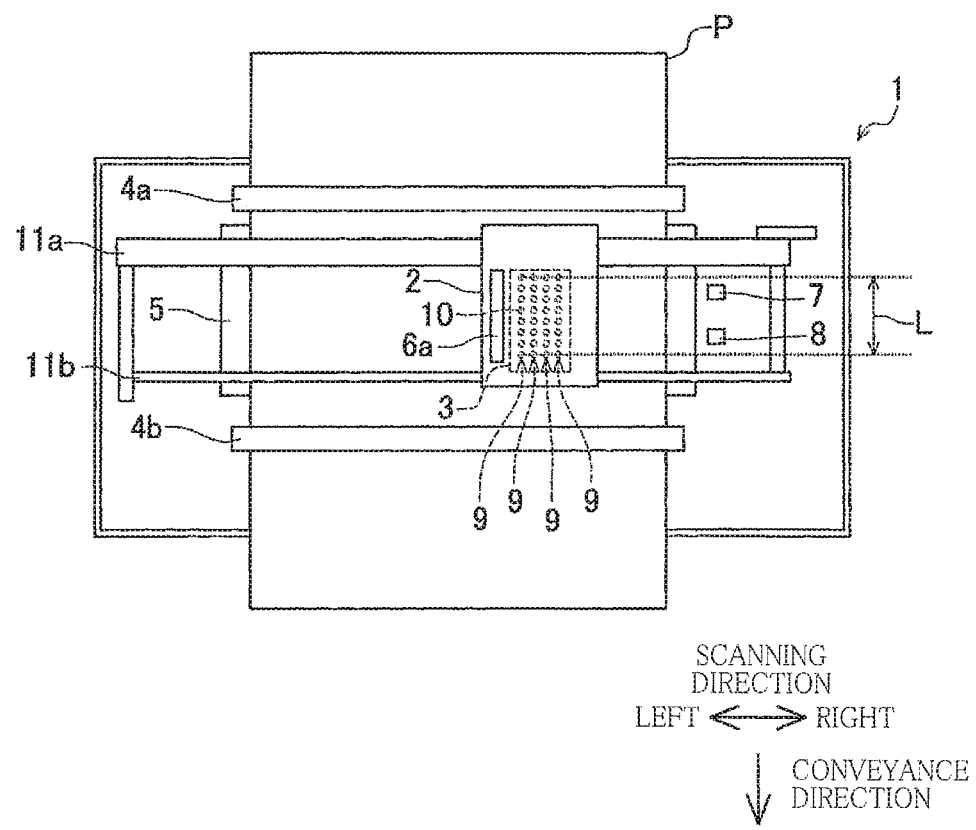
FIG. 18 is a view schematically showing a structure of an ink-jet printer according to a twelfth modification.

In a twelfth modification shown in FIG. 18, only the left-side density sensor 6a is mounted on the carriage 2. In this configuration, in an instance where the ink-jet printer is configured to perform the so-called one-way printing in which ink is ejected from the nozzles 10 only when the carriage 2 is moved rightward, the optical density Db of the overlapping region Rc is detected in the density detecting process.

In contrast to the twelfth modification, the ink-jet printer may be configured to perform the one-way printing by ejecting ink from the nozzles 10 only when the carriage 2 is moved leftward, and only the right-side density sensor 6b may be mounted on the carriage 2.

In an instance where the density detecting process is executed only when the carriage 2 is moved leftward or rightward even though the printer is configured to perform the bidirectional printing, only one of the density sensors 6a, 6b, which is located upstream in the movement direction of the carriage 2 when the density detecting process is executed, may be provided.

In the illustrated embodiment, the first through third ejecting operations, the second through fourth ejecting operations, the second through fourth ejecting operations, the third through fifth ejecting operations, . . . and the xth through (x+2)th ejecting operations are respectively regarded as the successive three ejecting operations, and the density detecting process is executed during the movement of the carriage 2 in the second ejecting operation, the third ejecting operation, the fourth ejecting operation, . . . and the (x+1)th ejecting operation. That is, the density detecting process is executed both of when the carriage 2 is moved rightward and when the carriage 2 is moved leftward. In view of this, the density sensors 6a, 6b are disposed on one and the other of the opposite sides of the ink-jet head 3 in the scanning direction for detecting the density of the high-density region Rf immediately after the ink has been attached.

For instance, the first through third ejecting operations, the third through fifth ejecting operations, the fifth through seventh ejecting operations, . . . and the (2y−1)th through (2y+1)th ejecting operations may be respectively regarded as the successive three ejecting operations, and the density detecting process may be executed during the movement of the carriage in the second ejecting operation, the fourth ejecting operation, the sixth ejecting operation, . . . and 2yth ejecting operation. In this instance, the density detecting process is executed only when the carriage 2 is moved toward one of the left side and the right side. Thus, in an instance where the density detecting process is executed when the carriage 2 is moved toward the right side, only the left-side one of the density sensors 6a, 6b, i.e., the density sensor 6a, needs to be provided. On the other hand, in an instance where the density detecting process is executed when the carriage 2 is moved leftward, only the right-side one of the density sensors 6a, 6b, i.e., the density sensor 6b, needs to be provided.

What is claimed is:

1. An ink-jet printer, comprising:
an ink-jet head configured to eject ink from a plurality of nozzles while moving in a scanning direction;
a conveyor configured to convey a recording medium in a conveyance direction orthogonal to the scanning direction;
a density detector configured to move with the ink-jet head in the scanning direction for detecting a color density which is a density of a color on a surface of the recording medium; and
a controller configured to control the ink-jet head, the conveyor, and the density detector,
wherein the controller controls the ink-jet printer such that the ink-jet printer repeatedly and alternately performs an ejecting operation in which the ink-jet head ejects the ink from the nozzles based on print data while moving in the scanning direction and a conveying operation in which the conveyor conveys the recording medium, so that printing is repeatedly performed on the same predetermined region of the recording medium in a plurality of ejecting operations performed at least three times,
wherein, where successive three ejecting operations among the plurality of ejecting operations are defined as a first ejecting operation, a second ejecting operation, and a third ejecting operation in the order of performance, the controller executes:
a density detecting process for controlling the density detector to detect the color density of a predetermined region immediately after the ink ejected in the second ejecting operation has been attached to the predetermined region;
an estimated density calculating process for calculating, based on the color density detected in the density detecting process, an estimated density which is an estimated value of the color density of the predetermined region after fixation of the ink ejected in the second ejecting operation;
an ideal density calculating process for calculating, based on the print data, an ideal density which is an ideal value of the color density of the predetermined region after fixation of the ink ejected in the second ejecting operation; and
a correcting process for correcting the print data based on a difference between the estimated density and the ideal density, and
wherein the controller controls the ink-jet printer to perform the third ejecting operation based on the print data corrected in the correcting process.

2. The ink-jet printer according to claim 1, further comprising a storage in which is stored estimation data to be used for estimating, based on the color density detected by the density detector, the color density after fixation of the ink,
wherein a plurality of first estimation data are stored in the storage in connection with an ink fixing time condition which relates to an ink fixing time,
wherein the controller further executes a first data selecting process for selecting one first estimation data from among the plurality of the first estimation data in accordance with the ink fixing time condition, and
wherein the controller calculates the estimated density in the estimated density calculating process based on the color density detected in the density detecting process and the one first estimation data selected in the first data selecting process.

3. The ink-jet printer according to claim 2,
wherein the ink fixing time condition includes a condition relating to a type of the recording medium,
wherein the controller further executes a type obtaining process for obtaining the type of the recording medium, and
wherein the controller selects, in the first data selecting process, the one first estimation data in accordance with the type of the recording medium.

4. The ink-jet printer according to claim 2, further comprising a temperature sensor for detecting a temperature around the recording medium,
wherein the fixing time condition includes a condition relating to the temperature around the recording medium, and
wherein the controller selects, in the first data selecting process, the one first estimation data in accordance with the temperature detected by the temperature sensor.

5. The ink-jet printer according to claim 2, further comprising a humidity sensor for detecting a humidity around the recording medium,
wherein the fixing time condition includes a condition relating to the humidity around the recording medium, and
wherein the controller selects, in the first data selecting process, the one first estimation data in accordance with the humidity detected by the humidity sensor.

6. The ink-jet printer according to claim 2,
wherein, aside from the plurality of the first estimation data, a plurality of second estimation data are stored in the storage in connection with attached amount information which is information relating to an attached amount of the ink per unit area of the recording medium,
wherein the controller further executes:
an attached amount information obtaining process for obtaining the attached amount information in the predetermined region based on the print data; and
a second data selecting process for selecting one second estimation data from among the plurality of the second estimation data in accordance with the attached amount information in the predetermined region, and
wherein the controller calculates, in the estimated density calculating process, the estimated density based on the color density detected in the density detecting process, the one first estimation data selected in the first data selecting process, and the one second estimation data selected in the second data selecting process.

7. The ink-jet printer according to claim 1,
wherein the controller further executes a region specifying process for specifying, based on the print data, a high-density region among a plurality of divided regions which are obtained by dividing the predetermined region in the scanning direction, the high-density region having a dot occupation ratio higher than a predetermined threshold, the dot occupation ratio indicating a number of ink dots to be attached per unit area,
wherein the controller controls the density detector to detect the color density of the high-density region in the density detecting process, and
wherein the controller calculates the ideal density of the high-density region in the ideal density calculating process.

8. The ink-jet printer according to claim 7,
wherein, where a plurality of the high-density regions are present, the controller specifies, in the region specifying process, one high-density region among the plurality of the high-density regions which has the smallest number of successively adjacent blank dots to each of which the ink is not attached,
wherein the controller controls the density detector to detect the color density of the one high-density region in the density detecting process, and
wherein the controller calculates the ideal density of the one high-density region in the ideal density calculating process.

9. The ink-jet printer according to claim 1,
wherein the ink-jet head ejects the ink in mutually different colors from the plurality of nozzles,
wherein the controller further executes a dot occupation ratio obtaining process for obtaining, based on the print data, a dot occupation ratio in the predetermined region for each of the colors, the dot occupation ratio being a number of ink dots to be attached per unit area,
wherein the controller controls, in the density detecting process, the density detector to detect the color density of one of the colors having the highest dot occupation ratio in the predetermined region, and
wherein the controller calculates, in the ideal density calculating process, the ideal density for the one of the colors having the highest dot occupation ratio in the predetermined region.

10. The ink-jet printer according to claim 9,
wherein the density detector is configured to emit light toward the recording medium and to receive light reflected on the recording medium, so as to detect the color density on the surface of the recording medium, and
wherein, in the density detecting process, the controller controls the density detector to emit, toward the predetermined region, light whose color is a complementary color for the one of the colors having the highest dot occupation ratio and to detect the color density of the one of the colors in the predetermined region.

11. The ink-jet printer according to claim 9, wherein, in the correcting process, the controller corrects print data for the respective colors in proportions of the dot occupation ratios of the respective colors, based on the difference between the estimated density and the ideal density for the one of the colors having the highest dot occupation ratio.

12. A method of performing printing by an ink-jet printer, comprising:
an ejecting step of ejecting ink from a plurality of nozzles of an ink-jet head based on print data while moving the ink-jet head in a scanning direction; and
a conveying step of conveying, by a conveyor, a recording medium in a conveyance direction orthogonal to the scanning direction,
wherein the ejecting step and the conveying step are repeatedly and alternately executed, so that printing is repeatedly performed on the same predetermined region of the recording medium by a plurality of ejecting steps executed at least three times,
wherein, where successive three ejecting steps among the plurality of ejecting steps are defined as a first ejecting step, a second ejecting step, and a third ejecting step in the order of execution, the method further comprising:
a density detecting step of detecting a color density of a predetermined region immediately after the ink ejected in the second ejecting step has been attached to the predetermined region, by a density detector configured to move with the ink-jet head in the scanning direction for detecting the color density on a surface of the recording medium;
an estimated density calculating step of calculating, based on the color density detected in the density detecting step, an estimated density which is an estimated value of the color density of the predetermined region after fixation of the ink ejected in the second ejecting step;
an ideal density calculating step of calculating, based on the print data, an ideal density which is an ideal value of the color density of the predetermined region after fixation of the ink ejected in the second ejecting step; and
a correcting step of correcting the print data based on a difference between the estimated density and the ideal density,
wherein the ink is ejected from the nozzles based on the corrected print data in the third ejecting step.

* * * * *